April 20, 1965   R. W. NOLAN ETAL   3,178,925
EXTRUSION DIE
Filed Dec. 23, 1960   3 Sheets-Sheet 1

INVENTORS
ROBERT W. NOLAN
HAROLD R. OSMICK
FRANK J. PENOZA
BY Harry J. McCauley
ATTORNEY April 20, 1965   R. W. NOLAN ETAL   3,178,925
EXTRUSION DIE
Filed Dec. 23, 1960   3 Sheets-Sheet 2

INVENTORS
ROBERT W. NOLAN
HAROLD R. OSMICK
FRANK J. PENOZA
BY Harry J. McCauley
ATTORNEY April 20, 1965   R. W. NOLAN ETAL   3,178,925
EXTRUSION DIE Filed Dec. 23, 1960   3 Sheets-Sheet 3

*INVENTORS*
ROBERT W. NOLAN
HAROLD R. OSMICK
BY   FRANK J. PENOZA

*Harry J. McCauley*
ATTORNEY

United States Patent Office 3,178,925
Patented Apr. 20, 1965

3,178,925
EXTRUSION DIE
Robert W. Nolan, Wilmington, Harold R. Osmick, Newark, and Frank J. Penoza, Wilmington, Del., assignors to E. I. du Pont de Nemours and Company, Wilmington, Del., a corporation of Delaware
Filed Dec. 23, 1960, Ser. No. 78,165
6 Claims. (Cl. 72—364)

This invention relates to an extrusion die, and particularly to an improved hot metal extrusion die incorporating a nib fabricated from a refractory composition having a relatively low ductility and a strength too low to restrain the stresses imposed in hot metal extrusion.

Typical refractory compositions of relatively low ductility which have proved exceptionally useful in the fabrication of hot metal extrusion die nibs are the metal silicides taught in copending U.S. Application Serial No. 78,102, filed of even date herewith, now U.S. Patent No. 3,110,092, issued December 12, 1963. Such nibs require support housings adapted to provide uniform support to the relatively brittle nibs over a wide range of presures and temperatures, since the extrusions are conducted at levels up to 2800° F., or even higher. The nib is thus subjected to very large thermal stresses as well as to the heavy loadings applied during the metal extrusion itself, and a serious problem of accommodating both exists.

Figure 1:
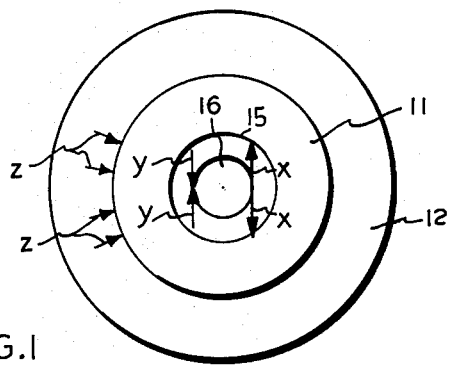

It is an object of this invention to provide an improved die construction utilizing a refractory composition nib, such as a nib fabricated from one of the metal silicides, for example, in order that such nibs can be used in hot metal extrusion. Other objects of this invention include the provision of a relatively inexpensive design of refractory composition die, one which is readily fabricated and one which, to a considerable degree, balances thermal stresses in opposition to the loadings applied in the reverse sense during the hot metal extrusion operation. The manner in which these and other objects of this invention are attained will become apparent from the following detailed description and the drawings, in which:

FIG. 1 is a schematic representation in plan of the critical forces applied to a circular bore extrusion die nib during a hot metal extrusion, the lengths of the several vectors indicating the approximate relative magnitudes of representative tangential opposed and radial forces acting on the bore opening.

Figure 2:
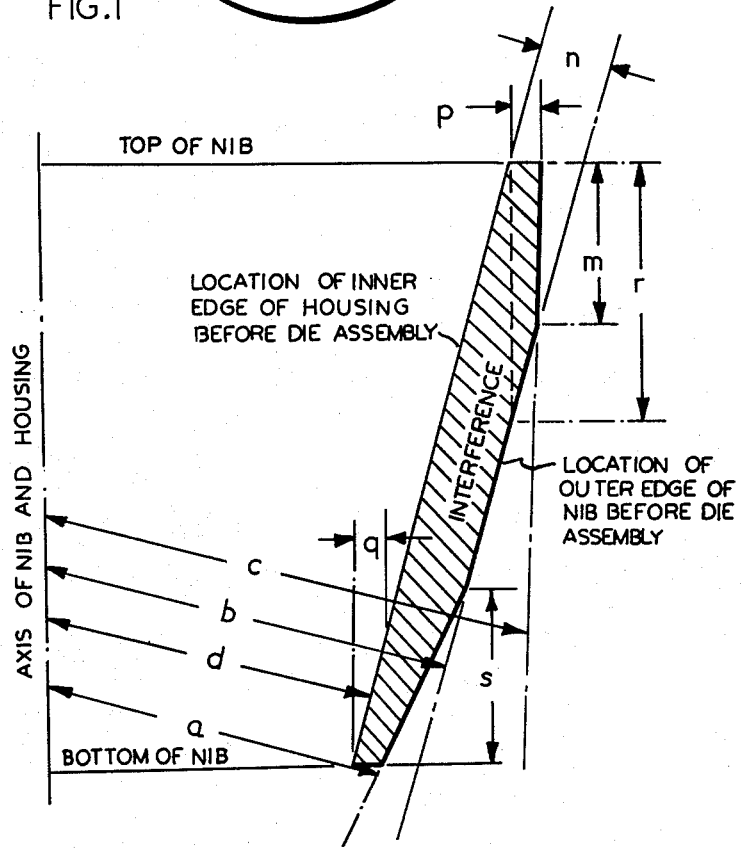
Figure 3:
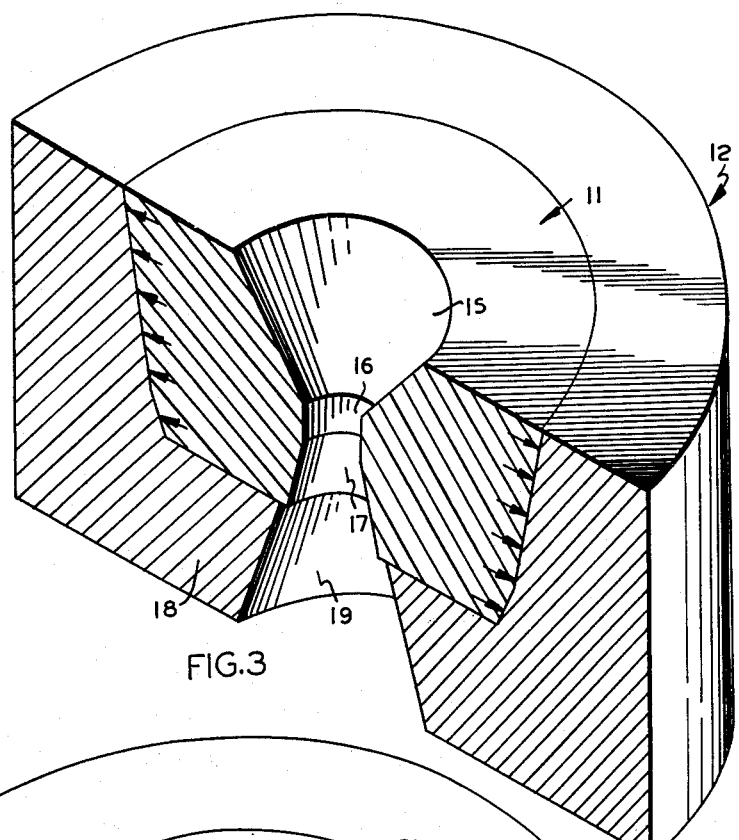
Figure 7:
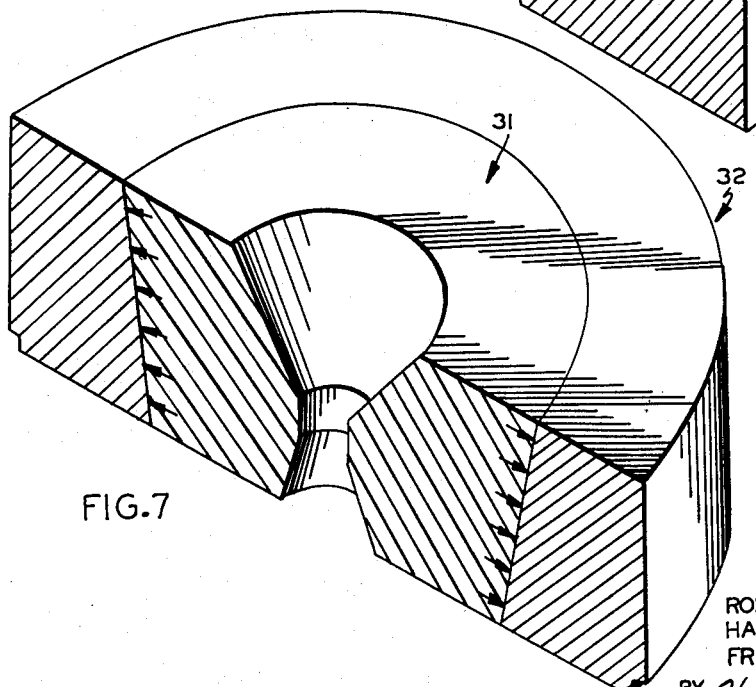
Figure 4:
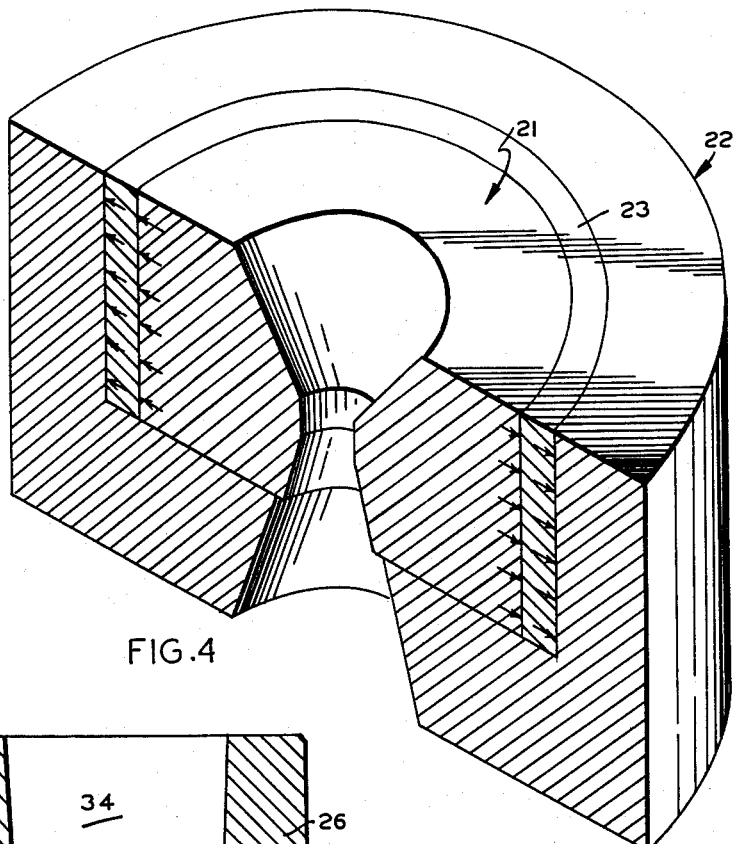
Figure 6A:
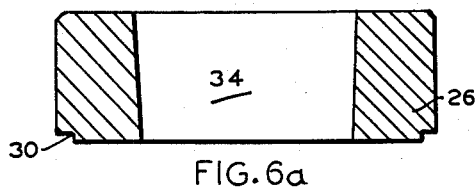
Figure 6:
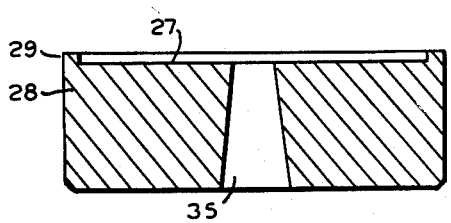
Figure 5:
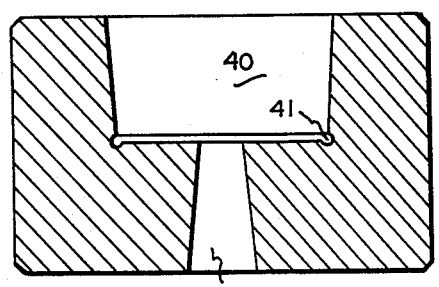
Figure 8:

FIG. 2 is a greatly exaggerated schematic representation of the confronting extremes of surface for one side of the die only for nib and housing in a preferred embodiment of this invention wherein the nib is provided with an outside circumference machined to a triple taper, whereas the housing is provided with an inside circumference machined to a single taper, FIGS. 3 to 7 are views of a number of embodiments of this invention which are partially diagrammatic in the showings of tapers to more clearly reveal these features while still adhering to a reasonable scale, of which FIG. 3 is a perspective sectional view, in full, of an embodiment of this invention wherein the nib is provided with an outside circumference machined to a dual taper, whereas the housing is provided with an inside circumference machined to a single taper, FIG. 4 is a perspective sectional view, in full, of another embodiment of this invention utilizing a metal ring of preselected thermal expansion characteristics as an intermediate locking piece holding the nib and housing in tight assembly one with another over the temperature range wherein extrusion is conducted, FIG. 5 is a vertical sectional view of a unitary construction of die housing adapted to use with numerous embodiments of this invention, FIGS. 6 and 6a are vertical sectional views of the two co-operating elements of another design of die housing adapted to use with numerous embodiments of this invention, FIG. 6 showing the base portion of the housing whereas FIG. 6a shows the ring portion of the housing, FIG. 7 is a perspective sectional view of the ring portion only of yet another embodiment of this invention, which ring portion is provided with an assembled die nib, and FIG. 8 is a fragmentary view in transverse section through the extrusion throat of a special design of die nib adapted to form fluted metal rods by hot extrusion.

Generally, the hot metal extrusion die of this invention comprises, in combination, a generally cylindrical nib fabricated from a refractory composition having a relatively low ductility provided with a stock receiving inlet substantially centrally located with respect to the nib narrowing progressively to the extrudate delivery opening in the nib, the nib being mounted within an elastic metal housing tightly encasing the nib circumferentially and provided at the outlet and adjacent the extrudate delivery opening with an elastic metal nib support plate extending substantially transverse the metal extrusion passage and across the nib over a substantial portion of the outlet end of the nib but clear of the extrudate delivery opening in the nib, the nib and the housing being assembled with a press fit interposing sufficient compressive loading generally radially inwards of the nib to develop a tangential compressive stress at the extrudate delivery opening of the nib at the temperature at which the hot metal extrusion is conducted which, when opposed to the reversely directed tangential tensile stress applied to the extrudate delivery opening during extrusion of metal through the opening, yields a resultant tangential tensile stress within the die nib substantially less than the tensile strength of the nib.

The principle upon which this invention operates will become clear from a consideration of FIG. 1, which is a top plan view of a hot metal extrusion die assembly incorporating a refractory composition nib 11, such as one of the metal silicides, for example, provided with a centrally disposed extrudate delivery opening 16, which nib is mounted securely within elastic metal enclosing housing 12. In accordance with the usage of the art, the complete assembly is hereinafter referred to as the extrusion "die," whereas the extrusion element 11 per se is referred to as the "nib."

It will be understood that, for purposes of clarity in the showing, only representative stress vectors are drawn in in FIG. 1, because of the fact that the structure is subjected to substantially uniform stresses throughout the entire 360° of circumferential expanse. Refractory composition nibs, such as those made up from the metal silicides, have a relatively high compressive strength but are much weaker in tension.

During hot metal extrusion, exceedingly high disruptive tensile stresses in the range of 100,000–200,000 p.s.i. are applied to opening 16, as indicated by vectors $x$. These are, of course, opposed by the inherent tensile strength propensities of the nib (not represented in FIG. 1), but this strength of the composition is, as mentioned relatively low.

The deficiency in strength is made up, according to this invention, by supplying predetermined tangential compressive stresses $y$ which result from inwardly directed radial force components $z$ contributed by housing 12 to nib 11. It is of the utmost importance that the stress balancing described be effected to a nicety over the entire temperature and stress range applicable to the extrusion which is to be performed, and, of course, that the stress balancing be exceedingly uniform over the entire structure.

A preferred embodiment of this invention is that represented by FIGS. 2 and 3, although these figures do not relate to the identical construction, in that FIG. 3 shows a nib with dual outside circumferential taper, whereas FIG. 2 shows a nib with triple outside circumferential taper. The triple-taper design appears to afford somewhat better stress distribution lengthwise of the nib with respect to most elastic metal housings, although the dual-taper nib is perfectly satisfactory in many instances, as is hereinafter described.

At the outset, it should be mentioned that all of the die nibs shown in the figures, each denoted by a reference numeral ascending progressively by units of ten, are identical in interior shape and dimensions. Thus, each is provided with a 45° inclination frusto-conical inlet (denoted by numeral only for FIGS. 1 and 3) 15 which is, typically, 0.40″ deep over-all for a nib of 1¾″ dia. x 1″ long. This inlet discharges into the extrudate delivery passage 16, which is a straight cylindrical bore typically ⁹⁄₁₆″–⁵⁄₈″ dia. x ⅛″ long, and this passage in turn discharges into a discharge passage 17 concentric with inlet 15 and passage 16, which discharge passage 17 is machined with an outwardly expanding taper of 2–5° with the vertical, a condition shown in some exaggeration in the figures for purposes of clarity.

The elastic metal housing 12 tightly enclosing nib 11 is, in the embodiment of FIGS. 2–3, unitary in construction and of generally cupped form as shown in FIG. 5, typically 3¼″ in outside dia. x 2″ high. In this instance the cup 40 provided in the housing measured 1″ deep and was machined with a 1° inwardly tapered wall. To provide a uniform shape of juncture between housing wall and base, the bottom of cup 40 was machined with a circumferential semicircular profile undercut 41 formed on ¹⁄₁₆″ radius. The centrally disposed discharge passage 42 of the die was tapered outwardly about 5°. Both top and bottom edges of the housing were chamfered at 45° for a ¹⁄₁₆″ length over the full 360° circumference.

Referring to the specific design of FIG. 3, the bottom of the housing is an inwardly projecting annular shelf 18, typically 1″ thick measured in the direction of metal extrusion provided with passage 19, concentric with passages 15, 16 and 17, of a minimum diameter somewhat greater than that of the discharge opening of passage 17, so that the walls of passage 17 overhang the periphery of passage 19 radially by an amount of, typically, about ¹⁄₃₂″–¹⁄₁₆″. As shown to some exaggeration in FIG. 3, passage 19 is tapered outwardly in the direction of metal extrusion about 5°. As indicated by the radially outwardly directed arrows in FIGS. 3, 4 and 7, assembly of the nibs within their individual housings is effected with a cold (or cold to hot) press fit of an interference predetermined to maintain a tight assembly of nib within housing at all temperatures to which the die is to be exposed and, even more important, such as to contribute uniformly the essential tangential compressive stresses $y$ which supplement the inherent tensile strength of the nibs, so that the sum is sufficient to easily withstand the extremely heavy disruptive tangential tensile stresses $x$ applied to the nib during the hot metal extrusion.

A preferred design of interference fit of nib with housing is that depicted somewhat schematically and with exaggeration of taper angles in FIG. 2, wherein the outside circumference of the nib is machined to three separate tapers of progressively increased magnitude from the metal-receiving inlet to the metal-delivery outlet of the nib. Thus, with all tapers herein referred to the axis of the nib and housing as base line, the lower end of the nib is provided with a first taper $a$ of 1°34′ which extends for a distance of $s=¼$ for the nib of 1″ over-all length hereinbefore detailed. A taper identical with $a$ is employed for the lowermost of the tapers in the design of FIG. 3. The next taper in order is $b$, equal to 1°0′ which, in the design of FIG. 3, extends over the entire remainder of the nib length but, in FIG. 2, terminates a distance $m$ from the top of the nib typically equal to ⁹⁄₁₆″. The last of the three tapers in the FIG. 2 construction is $c$, which is only 0°15′ from the vertical. The inside taper of the cooperating housing 12 is indicated at $d$, which is a uniform 1°0′ taper over the full length of the cup interior of the housing. Thus, it will be seen that the amount of interference with the nib assembled within its supporting housing is that denoted in exaggeration by the irregularly shaped cross-hatched area of FIG. 2 which, over its greater length, is typically $n$ thick, equal to 0.005″ but at the entrance and exit ends of the die, respectively, decreases to dimensions, more conveniently measured in a vertical plane, $p$ and $q$, each typically equal to 0.0025″.

The triple taper construction of FIG. 2 proportions, to some degree at least, the applicable radial forces $z$ to the thickness of nib wall opposed thereto at any given vertical level for a nib construction such as that depicted incorporating a frusto-conical inlet. In some instances the nibs have a tendency to spall off along the outside upper and lower peripheral edges where only a single unitary taper, such as $b$ of FIG. 2, was employed. A staged reduction of taper in three degrees cured this difficulty completely. Investigation has indicated that a dual-taper construction, such as that shown in FIG. 3, is also nearly always entirely free from the spalling difficulty. In general, nib-housing cup tapers in the range of 1°–2° maximum are adequate for this invention.

Another consideration which must be borne in mind in extrusion die design is that, other factors being equal, the higher the modulus of elasticity of the housing 12, the more the internal pressures of extrusion will be carried by the housing and the less by the nib. Steel of the usual type utilized in die housing fabrication has a modulus of elasticity of about $30 \times 10^6$ lbs./in.$^2$ which is fairly high; however, "Ferro-Tic C," hereinafter described with reference to the design of FIG. 7, is even better in this regard, since its modulus of elasticity is $44 \times 10^6$ lbs./in.$^2$.

A convenient fabrication procedure for the FIG. 2 embodiment is to first grind the inside of housing 12 to the 1° taper $d$, then grind nib 11 over its full length to the intermediate 1° taper $b$. After this, the nib is slipped within the housing without applying pressure and tried for fit between successive reducing grinding operations until the depth of insertion $r$, FIG. 2, is 0.29″. This gives the desired maximum interference $n=0.005″$ applicable over the greater part of the length and provides some flexibility in grinding the remaining tapers $a$ and $c$. We have found it most convenient to next grind away the lower auxiliary taper of 34 minutes which brings $a$ to its full value of 1°34′. Lastly, the top part of the nib circumference is ground away an auxiliary taper of 45 minutes inwards of taper $b$, leaving the final taper $c$ of only 15 minutes. Finally, nib 11 is pressed into housing 12 until it bottoms, whereupon the assembly is completed.

Referring to FIG. 4, there is shown another embodiment of this invention wherein a controlled stress compensation is achieved through the intermediary of a ring of metal which is preselected to have an elastic limit in compression low enough to protect the nib from excessive compression by the housing 22. Using an A.I.S.I. H–13 (typical analysis: 0.39% C, 1.00% Si, 5.50% Cr, 1.25% Mo, 1.00% V, balance Fe) housing 22 in conjunction with a metal silicide nib 21 having the nominal composition 49Mo5N28Si18Ti, a completely satisfactory material of fabrication for the full-length intermediary ring 23 was an A.I.S.I. austenitic stainless steel of the 300 series, typically A.I.S.I. 304 having the analysis 0.08% C (max.), 18–20% Cr, 8–11% Ni, 2% Mn (max.), balance Fe, which has a yield point in compression of approximately 30,000 p.s.i. Ring 23 is typically ³⁄₁₆″ thick and need not be tapered on either inside or outside surfaces. The counterbore in housing 22 can also be untapered as shown in FIG. 4, but formed undersize, so as to permit a press fit assembly with ring 23 based on an interference therebetween of about 0.002". A preferred method of assembly is to first press fit cold nib 21 within heated ring 23 with an interference fit of about 0.002" and, thereafter, press fit the nib-ring subassembly into housing 22 as a final step.

An important secondary consideration as regards the embodiment of FIG. 4 is the maintenance of a tight joinder of parts at the high temperatures at which hot metal extrusion is conducted. Thus, an A.I.S.I. H–13 metal housing 22 has a substantially higher thermal coefficient of expansion than does the metal silicide nib 21, which tends to loosen the nib within its supporting housing. However, a stainless steel ring 23 has a higher coefficient of thermal expansion than either nib 21 or housing 22, which thus perpetuates the tightness of the bond at the elevated temperatures. However, the most important service performed by ring 23 is that provided by its cold flow at pressures which fall near the threshold of the region where housing 22 might, at the maximum tightness condition, cause cracking or spalling of the nib. Slight visually undetectable flow of the metal in ring 23 relieves nib 21 of potentially destructive stress contribution by housing 22 and thus constitutes a type of "safety valve." Generally, we have found that it is not necessary to combine the embodiment of FIG. 4 with one of the other embodiments, e.g., those of FIGS. 2 or 3, to secure the extra advantage of the pressure relief feature which is resident in the ring 23 of FIG. 4; however, with some specific choices of housing material and nib composition, which may be dictated by extraneous conditions arising out of the particular hot metal extrusion which it is necessary to perform, it is obvious that such a combination can be advantageous.

The embodiments thus far described have all utilized unitary housings for nib support; however, a two-part ring-base construction, such as that shown in FIGS. 6 and 6a is sometimes to be preferred, because spreading of the ring element is not restricted by or associated with the necessity for corresponding movement on the part of the base. Such a construction of housing adapted to use with the nib hereinafter described with reference to FIG. 7 is shown in FIGS. 6 and 6a.

Referring to FIGS. 6 and 6a, ring element 26 is adapted to fit with precision-ground matching on the top surface 27 of base 28, the two parts together constituting a complete housing which could be duplicated by sawing housing 12, FIG. 3, transversely at the level of the top surface of annular shelf 18. The ring and base must, of course, be held together by suitable clamps or the equivalent not shown, and it is an aid to the assembly to machine an upraised ring, such as 29, typically 0.047" high, on base 28, which is adapted to engage snugly with a hand fit within a groove 30, typically 0.062" deep, machined in the other member of the pair. Of course, the relative positions of ring and groove can be interchanged between the two elements, if desired.

It is preferred to chamfer the two outside circumferential edges of the assembly to about a 1/16"–45° bevel for a full 360° around. A specific housing constructed according to FIGS. 6 and 6a, had both ring base 1" high over-all x 3" diameter, with the ring provided with an inwardly tapering (1°) bore 34 for the reception of an associated tapered nib not detailed. The upper diameter of bore 34 measured 1.746" and a satisfactory interference fit is insured when the nib, having an external 1° unitary taper, is machined to a dimension wherein it extends 0.114" above the top surface of ring 26 before force fitting, this producing an interference of about 0.004" throughout. Product delivery passage 35 in base 28 is tapered outwardly about 5°, the taper shown being somewhat exaggerated in FIG. 6.

Another embodiment of this invention is that shown in FIG. 7, which utilizes a two-part ring-base housing, such as that shown in FIGS. 6 and 6a, only the ring element 32 being shown in FIG. 7. In this construction resort is had to an elastic metal for housing construction which has thermal expansion characteristics preselected so as to impose a progressively greater tangential compressive stress $y$ with rise in temperature, so that the sum of nib transverse rupture strength plus tangential compressive stress contributed by ring 32 is sufficient to offset the disruptive loading imposed on the nib by hot metal extrusion. This general requirement is met by a housing material which displays a smaller thermal coefficient of expansion over at least a substantial portion of the temperature range involved than does the metal silicide nib. Thus, employing a relatively small interference fit in the cold assembly, the bonding joinder becomes tighter with temperature rise. It is to be understood that this matching of nib with ring must be rather carefully done, since a housing which becomes too restrictive in the radial sense will crack the nib at high temperatures before the stress thereon is offset by the counter stress contributed by the extrusion.

In a typical construction according to FIG. 7, the ring 32 was fabricated from "Ferro-Tic C," a product of the Sinter Cast Division, Chromalloy Corp., which consists of titanium carbide grains cemented together with a steel binder. Moreover, this material has a modulus of elasticity of approximately $44 \times 10^6$ lbs./in.$^2$, which is advantageous from the standpoint of stress transfer from nib to housing as hereinbefore described. This ring was provided with a metal silicide nib 31 (nominal composition 18.2Fe54.5Mo18.2Si9.1ZrO$_2$) which was assembled in the ring with a simple unitary 1° taper fit on confronting surfaces, which provided a 2–4 thousandths bonding interference over the entire temperature range of utilization, which was about 2100° F.

The following are examples of typical hot metal extrusions conducted with representative die designs of this invention. Nibs made up from sintered metal silicides consisting essentially of 14–57% Si, 14–65% individually of at least two metals from the group consisting of Fe, Groups IV–A, V–A and VI–A of the Periodic Table, and from about 5–20% of a metal oxide taken from the group consisting of ZrO$_2$, ZnO and Cr$_2$O$_3$, all as described in U.S. application Serial No. 78,102, (now Patent No. 3,110,092), hereinbefore mentioned, are particularly preferred, because of their high self-lubricity coupled with high strength displayed during fabrication. Die nibs are conventionally appraised in the art by the degree of "washout" which they display in service, by which is meant the progressive enlargement of the nib mouth occurring as a consequence of extrusion. In all of the tests hereinafter reported there was substantially zero nib washout.

All of the extrusions were conducted on dies having circular orifices in the range of about 0.222" to about 0.5" diameter as hereinafter reported. The "reduction ratio" given is defined as the ratio of the cross-sectional areas of billet fed to extrudate product. A conventional oil lubricant (colloidal graphite suspended in a light oil) was used to lubricate the metal conduits, called "containers" in the art, provided upstream of the die for directing the billets fed to the extrusion. These containers were preheated to high temperatures, e.g., 1100° F., so as not to chill the hot billets supplied to the dies, and the oil vehicle thus flashed almost instantaneously to leave only a very light graphite residue on the interiors of the containers. Consequently, little or no lubricant is believed to have entered, or been carried into, the dies per se.

*Example 1*

A die design constructed with the triple taper hereinbefore described with reference to FIGS. 2 and 3 was utilized. The nib had a nominal composition of 18.2Fe54.5Mo18.2Si9.1ZrO₂ whereas the housing was A.I.S.I. H–13 tool steel.

The die was initially preheated to 850° F. and then brass billets heated to 1300° F. and measuring 0.050" dia. x 2" long were extruded therethrough at a reduction ratio of 20 to 1 to produce 0.223" dia. rods. Six rods, each measuring approximately 36" in length, were made without any damage whatever to the die and with good quality of the extrudate.

*Example 2*

A die identical in design with Example 1 but provided with a nib having a nominal composition of 30.3Fe30.3Mo30.3Si9.1ZrO₂ was used to extrude A.I.S.I. 1018 (general analysis: 0.15–0.20% C, 0.60–0.90% Mn, 0.040% (max.) P, 0.050% (max.) S, balance Fe) steel.

The die was preheated to 850° F. and billets, measuring 0.950" dia. x 2" long, were fed thereto at a temperature of 2100° F. and reduction ratio of 20 to 1. Seven rods measuring 0.223" dia. and of good quality were obtained without any damage to the die.

*Example 3*

A die provided with an A.I.S.I. 304 stainless steel ring insert such as that described with reference to FIG. 4 was utilized to extrude a nickel-chromium alloy having the composition 80Ni20Cr. The nib had a nominal composition of 49Mo5N28Si18Ti, whereas the housing was A.I.S.I. H–13 tool steel.

The die was initially preheated to 850° F. and then the alloy billet heated to 2100° F. and measuring 0.950" dia. x 2" long was extruded therethrough at a reduction ratio of 20 to 1 to produce a 0.223" dia. rod 36" in length. The extruded rod had a good quality surface finish and the die was completely undamaged by the extrusion.

*Example 4*

A die constructed in accordance with the design of FIG. 7 hereinbefore described had a Ferro-Tic housing within which was mounted a nib of nominal composition 18.2Fe54.5Mo18.2Si9.1ZrO₂. The nib was press-fit assembled in the housing at room temperature employing a 0.002" diametrical interference. This die was utilized for the extrusion of nickel-chromium alloy (80Ni20Cr) into circular cross-section rods 0.250" diameter.

The die was initially preheated to 1100° F. and then Ni-Cr alloy billets heated to 2100° F. and measuring 0.950" dia. x 2" long were extruded therethrough at a reduction ratio of 20 to 1. Four extrudate rods were made, all having a high quality surface finish, without any damage to the die.

*Example 5*

A die constructed with a dual-taper interference fit, with taper *a* of FIG. 2 1° 34' and the remainder of the nib tapered at 1° 0' was mounted with a diametrical interference fit of 0.010" within an A.I.S.I. H–13 tool steel housing. The nib had the nominal composition 21.8Fe28.2Si35.5Ti9.1ZrO₂ 5.45 inerts (e.g., Al, Mn, Ca, Mg, Cu, and Ni).

The die was initially preheated to 1100° F. and was used to extrude A.I.S.I. 416 stainless steel having the typical analysis 0.15% (max.) C, 12.0–14.0% Cr, 0.07% (min.) P, S, Se, 0.60% (max.) Zr, Mo, balance Fe. The steel billets fed measured 0.950" dia. x 2" long and were heated to 2320° F. before passage through the die. Three rod lengths measuring 0.222" in dia. and approximately 36" long were obtained at a reduction ratio of 20 to 1. The extruded rods had good surface quality and there was no evidence of damage to the die.

*Example 6*

A die of design identical with that of Example 5, but provided with a nib of nominal composition 30.3Fe30.3Mo30.3Si9.1ZrO₂, was employed for the extrusion of A.I.S.I. 1018 steel. The die was preheated to 850° F. before the extrusion was started, after which the steel billets heated to 2100° F. and measuring 0.950" dia. x 2" long were fed through.

Twenty-three extruded lengths 0.222" dia. and approximately 36" long were formed (reduction ratio 20 to 1) with good surface quality of product and without damage to the die.

Immediately thereafter, this die was used to extrude eight lengths of A.I.S.I. H–13 tool steel at the same reduction ratio. The tool steel was supplied to the die at 2400° F. in billets measuring 0.950" dia. x 2" long. The extruded product again measured 0.222" in dia. and approximately 36" long. Product quality was good and the die exhibited no damage whatever from the extrusion through it.

*Example 7*

A die of design identical with that of Example 5, but provided with a nib of nominal composition 50MoSi₂50Al₂O₃ was employed for the extrusion of nickel-chromium-thoria alloy having the composition 72.7Ni18.2Cr9.1ThO₂

The die was preheated to 850° F., whereas the material to be extruded was preheated to 2150° F.

The billets fed measured 0.950" dia. and of varying lengths, and the products obtained were rods measuring 0.222" dia., under which conditions the reduction ratio was 20 to 1. The quality of the extrudate rods was good and the die was undamaged in the test.

*Example 8*

A die of design identical with that of Example 5, but provided with a nib of nominal composition 30.3Fe30.3Mo30.3Si9.1ZrO₂ having an orifice size of 0.50" instead of 0.223" was employed for the extrusion of niobium (previously called columbium) metal. The die was preheated to 850° F. and the metal to be extruded to 2540° F. in the case of the first billet passed through, and 2640° F. in the case of the second billet.

Both billets measured 0.950" dia. x 2" long and the extruded products were rods 0.5" dia. x 7" long, giving a reduction ratio of 4 to 1. The quality of the product was good and the die was not damaged by the extrusion.

*Example 9*

A die constructed with a dual taper interference fit identical with that of Example 5 but provided with a nib consisting of 60.6Mo30.3Si9.1ZrO₂, having an orifice diameter of 0.223" was employed for the extrusion of a nickel-chromium alloy (80% Ni, 20% Cr). The die was preheated to 1100° F. and the billets fed were preheated to 2200° F.

The eight billets fed measured 0.950" dia. x 2" long and the extruded products were rods 0.223" in diameter x 30 to 40" long, corresponding to a reduction ratio of 20 to 1. The extruded product had a good surface finish and there was no damage to the die resulting from the extrusion.

The foregoing tests were directed to the production of circular cross-section rods, a shape which is particularly useful in the arts. However, the principles of this invention are equally applicable to dies required for the manufacture of complex extrusion configurations. Thus, in one instance, a die made according to this invention was used to extrude a steel channel shape having a thickness of material of about ⅛", a length of web slightly under ½" and end flanges slightly more than ⅚₁₆" wide.

In another case, A.I.S.I. H–13 tool steel was extruded in the shape of a fluted cylinder by passage through an orifice having the shape depicted in FIG. 8. In this instance, the product had a maximum dimension such as to be included within a circumscribing circle measuring ½" in diameter with the diameter of the central hub slightly in excess of ¼". Thus, the four flutes, spaced 90° apart, measured approximately ⅛" long with a thickness of about ⅛".

The extrusion tests for a fluted product are reported as the following:

Example 10

A die of design identical with that of Example 5, but provided with a nib having the nominal composition 18.2Fe54.5Mo18.2Si9.1ZrO₂ formed with an orifice of the shape of FIG. 8 was utilized to extrude niobium metal. The nib was preheated to 850° F. initially and the billet temperature was 2660° F. The reduction ratio was approximately 3 to 1, the billet fed being 2" long x 0.950" dia., and the extrudate length was 4"–6".

The surface finish obtained was excellent and the die was undamaged in the test.

Example 11

The die with shaped nib used in Example 10 was utilized additionally to extrude three metals in sequence therethrough, each at a higher temperature than its predecessor. The reduction in all cases was the same at 3 to 1 and the billets fed were 2" long x 0.950" dia., with extrudate products about 18" long.

The sequence of the extrusions was as follows:

(a) Stock fed: 99.99% pure copper. The nib temperature was 850° F., the billet temperature 1500° F. Two extrusions were carried out. No die damage occurred and the surface finish of the extrudate was good.

(b) Stock fed: A.I.S.I. 1018 steel. The nib temperature was 850° F., the billet temperature 2100° F. Two extrusions were performed without damage to the die and with good surface maintenance on the extrudate.

(c) Stock fed: H–13 tool steel. The nib temperature was 850° F., the billet temperature 2400° F. Two extrusions were performed, with good surface finish on the product and no damage to the die.

It will be understood that the problem in the extrusion of complex shapes is more serious than the safeguarding against excessive hoop stresses in the region in immediate proximity to the circle circumscribing the maximum dimension of the extrusion orifice, due to the fact that protuberances directed inwardly from the nib side wall are, of necessity, relatively unsupported over their full lengths.

An important advantage of dies constructed according to this invention is their ability to deliver extrudate products having a high diametrical constancy over their full lengths. In all of the tests hereinbefore reported caliper measurements made on the leading and trailing ends of the extruded products showed a variation of 0.001" or less in this regard, which is within the range of experimental error for the measurement technique. This confirms the absence of washout, which is, of course, imperative for high precision production. Apparently, the die housings provided are rigid enough to insure completion of the extrusions without objectionable spreading, while still remaining elastic enough to accommodate the very great variations in temperature and pressure levels accompanying the extrusions.

From the foregoing, it will be understood that this invention can be modified in numerous respects within the skill of the art without departure from its essential spirit, and it is intended to be limited only within the scope of the following claims.

What is claimed is:

1. A hot metal extrusion die comprising, in combination, a generally cylindrical nib fabricated from a refractory composition having a relatively low ductility provided with a stock-receiving inlet substantially centrally located with respect to said nib narrowing progressively to the extrudate delivery opening in said nib, said nib being mounted with a press fit within a stainless steel ring having the approximate analysis 0.08% C (max.), 18–20% Cr. 8–11% Ni, 2% Mn (max.), balance Fe, and the sub-assembly consisting of said nib and said stainless steel ring being mounted in turn within an elastic metal housing tightly encasing said sub-assembly circumferentially and provided at the outlet end adjacent said extrudate delivery opening with an elastic metal nib support plate extending substantially transverse said metal extrusion passage and across said nib over a substantial portion of the outlet end of said nib but clear of said extrudate delivery opening in said nib, said sub-assembly and said housing being assembled with a press fit interposing sufficient compressive loading generally radially inwards of said nib through said stainless steel ring when added to the tensile strength of said nib such as to exceed the disruptive tensile stresses applied generally tangentially outwards of said nib during the extrusion of metal through said nib.

2. A method of extrusion comprising heating a billet to a temperature imparting plasticity and thereafter forcing the hot billet through a die having a generally cylindrical nib fabricated from a sintered metal silicide of refractory composition and relatively low ductility having the analysis 14–57% Si, 14–65% individually of at least two metals from the group consisting of Fe, Groups IV-A, V-A and VI-A of the Periodic Table, and from about 5–20% of a metal oxide taken from the group consisting of $ZrO_2$, $ZnO$ and $Cr_2O_3$, said nib being provided with a stock-receiving inlet substantially centrally located with respect to said nib narrowing progressively to the extrudate delivery opening in said nib, said nib being mounted within an elastic metal housing tightly encasing said nib circumferentially and provided at the outlet end adjacent said extrudate delivery opening with an elastic metal nib axial support plate extending substantially transverse said metal extrusion passage and across said nib over a substantial portion of the outlet end of said nib but clear of said extrudate delivery opening in said nib, said nib and said housing being assembled with a press fit interposing sufficient compressive loading generally radially inwards of said nib when added to the tensile strength of said nib such as to exceed the disruptive tensile stresses applied generally tangentially outwards of said nib during the extrusion of metal through said nib, said nib being preheated prior to the commencement of extrusion therethrough.

3. A hot metal extrusion die comprising, in combination, a generally cylindrical nib fabricated from a refractory composition having a relatively low ductility, the outside periphery of said nib being formed to a multiplicity of tapered fits with said housing, said tapered fits being staged with lengths disposed longitudinally with respect to the axis of said die in progressively decreased degree of taper measured from the longitudinal axis of said nib as reference from a maximum of about 1° to 2°, with the minimum diameter of said nib disposed at said outlet end of said nib, said nib being provided with a stock-receiving inlet substantially centrally located with respect to said nib narrowing progressively to the extrudate delivery opening in said nib, said nib being mounted within an elastic metal housing tightly encasing said nib circumferentially and provided at the outlet end adjacent said extrudate delivery opening with an elastic metal nib support plate extending substantially transverse said metal extrusion passage and across said nib over a substantial portion of the outlet end of said nib but clear of said extrudate delivery opening in said nib, said nib and said housing being assembled with a press fit interposing sufficient compressive loading generally radially inwards of said nib when added to the tensile strength of said nib such as to exceed the disruptive tensile stresses applied generally tangentially outwards of said nib during the extrusion of metal through said nib.

4. A hot metal extrusion die comprising, in combination, a generally cylindrical nib fabricated from a refractory composition having a high inherent lubricity but relatively low ductility consisting essentially of 14–57% Si, 14–65% individually of at least two metals from the group consisting of Fe, Groups IV–A, V–A and VI–A of the Periodic Table, and from about 5–20% of a metal oxide taken from the group consisting of $ZrO_2$, ZnO and $Cr_2O_3$ provided with a stock-receiving inlet substantially centrally located with respect to said nib narrowing progressively to the extrudate delivery opening in said nib, said nib being mounted within an elastic metal housing tightly encasing said nib circumferentially and provided at the outlet end adjacent said extrudate delivery opening with an elastic metal nib support plate extending substantially transverse said metal extrusion passage and across said nib over a substantial portion of the outlet end of said nib but clear of said extrudate delivery opening in said nib, said nib and said housing being assembled with a press fit interposing sufficient compressive loading generally radially inwards of said nib when added to the tensile strength of said nib such as to exceed the disruptive tensile stresses applied generally tangentially outwards of said nib during the extrusion of metal through said nib.

5. A method of extruding niobium metal comprising heating a niobium metal billet to a temperature of about 2540° F. and thereafter forcing the hot billet through a die having a generally cylindrical nib fabricated from a sintered metal silicide having a composition in weight percent of 14–57% Si, 14–65% individually of at least two metals from the group consisting of Fe, Groups IV–A, V–A and VI–A of the Periodic Table, and from about 5–20% of a metal oxide taken from the group consisting of $ZrO_2$, ZnO and $Cr_2O_3$, and wherein said nib is preliminarily heated to about 850° F. prior to the commencement of the extrusion therethrough, said nib being provided with a stock-receiving inlet substantially centrally located with respect to said nib narrowing progressively to the extrudate delivery opening in said nib, said nib being mounted within an elastic metal housing tightly encasing said nib circumferentially and provided at the outlet end adjacent said extrudate delivery opening with an elastic metal nib support plate extending substantially transverse said metal extrusion passage and across said nib over a substantial portion of the outlet end of said nib but clear of said extrudate delivery opening in said nib, said nib and said housing being assembled with a press fit interposing sufficient compressive loading generally radially inwards of said nib when added to the tensile strength of said nib such as to exceed the disruptive tensile stresses applied generally tangentially outwards of said nib during the extrusion of metal through said nib.

6. A method of extruding niobium metal according to claim 5 wherein said nib is fabricated from a sintered metal silicide having the composition in weight percent of 30.3% Fe, 30.3% Mo, 30.3% Si and 9.1% $ZrO_2$.

References Cited by the Examiner

UNITED STATES PATENTS

| | | | |
|---|---|---|---|
| 935,463 | 9/09 | Coolidge | 207—17 |
| 1,817,680 | 8/31 | Pratt | 207—17 |
| 1,840,472 | 1/32 | Singer | 207—17 |
| 2,027,787 | 1/36 | Ridgway et al. | 207—17 XR |
| 2,111,046 | 3/38 | Friedman | 205—26 |
| 2,194,283 | 3/40 | Kidd | 207—16 |
| 2,219,442 | 10/40 | Chesler et al. | 207—17 XR |
| 2,350,465 | 6/44 | Keshian | 205—26 |
| 2,708,512 | 5/55 | Schlecht et al. | 205—26 |
| 2,975,893 | 3/61 | Johnson | 207—16 XR |
| 2,979,973 | 4/61 | Brauchler et al. | 207—17 XR |

OTHER REFERENCES

"Precison Cold Extrusion Technology for High Temperature Metals," paper No. 167, 1958.

MICHAEL V. BRINDISI, *Primary Examiner.*

WILLIAM W. DYER, Jr., CHARLES W. LANHAM, THOMAS E. BEALL, *Examiners.*

UNITED STATES PATENT OFFICE
CERTIFICATE OF CORRECTION

Patent No. 3,178,925                                                April 20, 1965

Robert W. Nolan et al.

It is hereby certified that error appears in the above numbered patent requiring correction and that the said Letters Patent should read as corrected below.

Column 5, line 62, before "base" insert -- and --; column 7, line 5, for "0.050" read -- 0.950 --; column 10, line 9, for "Cr." read -- Cr, --.

Signed and sealed this 24th day of August 1965.

(SEAL)
Attest:

ERNEST W. SWIDER                                      EDWARD J. BRENNER
Attesting Officer                                          Commissioner of Patents